US008768013B2

(12) United States Patent
Fenrich

(10) Patent No.: US 8,768,013 B2
(45) Date of Patent: Jul. 1, 2014

(54) SYSTEM AND METHOD FOR IMPLEMENTING ALGORITHMIC CORRECTION OF IMAGE DISTORTION WITHIN A FINGERPRINT IMAGING SYSTEM

(75) Inventor: Richard Karl Fenrich, Blacksburg, VA (US)

(73) Assignee: Identification International, Inc., Blacksburg, VA (US)

( * ) Notice: Subject to any disclaimer, the term of this patent is extended or adjusted under 35 U.S.C. 154(b) by 55 days.

(21) Appl. No.: 13/286,895

(22) Filed: Nov. 1, 2011

(65) Prior Publication Data
US 2012/0141043 A1    Jun. 7, 2012

Related U.S. Application Data

(63) Continuation of application No. 11/515,912, filed on Sep. 6, 2006, now Pat. No. 8,068,646.

(60) Provisional application No. 60/713,765, filed on Sep. 6, 2005.

(51) Int. Cl.
*G06K 9/00* (2006.01)

(52) U.S. Cl.
USPC ............ 382/115; 382/124; 382/125; 382/275

(58) Field of Classification Search
USPC .................. 382/115, 124, 125, 275
See application file for complete search history.

(56) References Cited

U.S. PATENT DOCUMENTS

| 6,373,969 | B1 * | 4/2002 | Adler | 382/127 |
| 6,463,166 | B1 * | 10/2002 | Fujiwara | 382/127 |
| 6,763,127 | B1 | 7/2004 | Lin et al. | 382/125 |
| 7,822,236 | B2 * | 10/2010 | Fenrich et al. | 382/124 |
| 8,068,646 | B2 * | 11/2011 | Fenrich | 382/124 |
| 2003/0053228 | A1 * | 3/2003 | Lee et al. | 359/860 |
| 2004/0101174 | A1 | 5/2004 | Sato et al. | 382/124 |
| 2004/0156555 | A1 * | 8/2004 | Irving et al. | 382/274 |
| 2005/0025313 | A1 | 2/2005 | Wachtel et al. | 380/54 |
| 2005/0111706 | A1 | 5/2005 | Bohn et al. | 382/124 |
| 2006/0045316 | A1 * | 3/2006 | Hauke et al. | 382/116 |
| 2007/0058844 | A1 | 3/2007 | Fenrich | 382/124 |

OTHER PUBLICATIONS

Ojanen, Harri, "Automatic Correction of Lens Distortion by Using Digital Image Processing", Rutgers University, Dept. of Mathematics Technical Report, Jul. 10, 1999, URL: http://citeseerx.ist.psu.edu/viewdoc/_download?doi=10.1.1.28.8132&rep=rep1&type=pdf, 6 pages.

(Continued)

*Primary Examiner* — Matthew Bella
*Assistant Examiner* — Julian Brooks
(74) *Attorney, Agent, or Firm* — Pillsbury Winthrop Shaw Pittman LLP

(57) ABSTRACT

A software implemented system and method for algorithmic correction of systematic image distortions within fingerprint imaging systems. The system and method may implement a three dimensional geometric model of a fingerprint imaging system to discover where a configuration prescribed by a conceptual fingerprint imaging system and an actual configuration of a manufactured fingerprint imaging system differ. By describing this difference using the geometric model, images captured by the manufactured fingerprint imaging system can be rectified in operational use to generate rectified images with relatively low amounts of distortion present.

20 Claims, 4 Drawing Sheets

(56) References Cited

OTHER PUBLICATIONS

Heikkila, Janne, "Accurate Camera Calibration and Feature Based 3-D Reconstruction from Monocular Image Sequences", Ph.D. Thesis Oct. 10, 1997, Retrieved from the Internet URL: http://www.ee.oulu.fi/myg/files/pdf/pdf_160.pdf, retrieved on Oct. 15, 2010, XP-002605464, 129 pages.

Maltoni, D. et al., "Handbook of Fingerprint Recognition", Apr. 24, 2003, Springer, ISBN: 0387954317, XP-002605465, pp. 59-60.

Heikkila, Janne, et al., "Calibration Procedure for Short Focal Length Off-the-Shelf CCD Cameras", *Proceedings of the International Conference on Pattern Recognition,* vol. 1, Jan. 1, 1996, XP-002350077, pp. 166-170.

Heikkila, Janne, et al., "A Four-Step Camera Calibration Procedure with Implicit Image Correction", *Proceedings of the IEEE Computer Society Conference on Computer Vision and Pattern Recognition,* Jun. 17, 1997, ISBN: 978-0-8186-7822-6, XP-010237491, pp. 1106-1112.

Yang, Yao-Quan, et al., "An Image Correction-Based Approach to Camera Calibration", *Proceedings of 2004 International Conference on Machine Learning and Cybernetics,* vol. 6, Aug. 26, 2004, pp. 3751-3754.

Zhang, Zhengyou, "Flexible Camera Calibration by Viewing a Plane from Unknown Orientations", *The Proceedings of the Seventh IEEE International Conference on Computer Vision,* vol. 1, Sep. 20, 1999, pp. 666-673, XP010350391.

\* cited by examiner

SYSTEM AND METHOD FOR IMPLEMENTING ALGORITHMIC CORRECTION OF IMAGE DISTORTION WITHIN A FINGERPRINT IMAGING SYSTEM

RELATED APPLICATIONS

This application is a continuation of U.S. patent application Ser. No. 11/515,912, filed Sep. 6, 2006, which in turn claims priority under 35 U.S.C. §119(e) to Provisional Application No. 60/713,765, filed Sep. 6, 2005, both of which are hereby incorporated by reference into the present application in their entirety.

FIELD OF THE INVENTION

The invention relates generally to software implemented, algorithmic correction of image distortions within fingerprint imaging systems.

BACKGROUND OF THE INVENTION

Conventional fingerprint imaging systems may implement distortion correction, also known as rectification, to correct for distortion that may typically include correction of radial distortions introduced by lenses. Such radial distortions may include barrel and pincushion distortion. Rectification also may correct for perspective distortions—those distortions which may be introduced into an imaging system due to the physical relationship between a principle point on the lens (e.g., the iris) and the scene being captured. Some fingerprint imaging systems may rectify radial and perspective correction in the system. For example, some conventional systems include hardware that may rectify radial and perspective distortion. However, other distortions may be present within a captured image due to curved surfaces in the light path. For instance, imaging through glass balls or from the reflection in a hyperbolic minor may introduce distortions in a captured image.

Collectively, these types of image distortions may be referred to as systematic imaging distortions. More specifically, systematic image distortions may include those distortions caused by surfaces within a fingerprint imaging system at which light may be processed (e.g., lens surfaces, mirror surfaces, other refractive surfaces, other reflective surfaces, and/or other surfaces formed by optical elements).

Generally, conventional rectifying solutions share a focus on correcting images that have been captured with a simple optical configuration within a fingerprint imaging system—a system which may include a camera and a lens that takes images or photographs of a scene in three dimensions. Conventional solutions often fail to address more complex optical configurations that include optical elements beyond the lens. That is, the simple imaging systems may not compensate for images captured with multiple optical elements, or a more complex optical element, in the light path, such as windows, prisms, non-aligned lenses, balls, or other transparent or semi-transparent media or reflective surfaces.

Traditionally, attempts to minimize distortion in fingerprint imaging systems have been conducted during a design phase. Often, an iterative design process may be used in which building and analyzing prototype systems results in the final fingerprint imaging system design. The resulting design that meets the distortion goals may incorporate allowable tolerances on system components. Often, additional optical components may be required in the design to correct distortions to an acceptable level.

During manufacturing, fingerprint imaging systems may be built according to the final fingerprint imaging system design. Typically, components are assembled and during a quality assurance step, the components are adjusted to ensure that the distortions in each manufactured system do not exceed various tolerances. In order ensure that system distortions do not exceed these tolerances, optical components of a relatively high quality and expense are often used. For example, to adhere to the overall system tolerances, the components themselves may be required to be manufactured with high precision, thereby increasing a cost of manufacturing the corresponding optical component.

In some instances a calibration may be implemented to assure that the optical components are aligned with a predetermined precision (i.e., within predetermined alignment tolerances). Calibration typically involves adjusting component locations with respect to one another to correct distortion in images captured by the manufactured systems. This calibration step can be rather involved for higher precision fingerprint imaging system designs with relatively tight alignment tolerances.

During operation, performance of a fingerprint imaging system may degrade over time. Generally, restoring the calibration of a fingerprint imaging system typically includes a physical adjustment of components within the system to correct for image distortions, and to ensure that the alignment of the optical components within the fingerprint imaging system falls within the predetermined alignment tolerances, which may be costly and/or time consuming. Other drawbacks in conventional fingerprint imaging systems exist.

SUMMARY

These and other drawbacks are addressed by various embodiments of the invention.

One aspect of the invention relates to a software implemented system and method for algorithmic correction of image distortions, such as systematic distortions, within fingerprint imaging systems. The system and method may implement a three dimensional geometric model of a fingerprint imaging system to discover where a configuration of a conceptual fingerprint imaging system, built according to a system design with no (or substantially no) imperfections, and an actual configuration of a manufactured fingerprint imaging system built according to the system design differ. The difference (or differences) between the conceptual fingerprint imaging system and the manufactured fingerprint imaging system may arise due to imperfections in the manufactured fingerprint imaging system, including imperfections in alignment and/or configuration of the optical elements, and imperfections in the optical elements themselves. By describing this difference using the geometric model, systematic distortion caused by the imperfections within the manufactured fingerprint imaging system may be corrected for, thereby enabling images captured by the manufactured fingerprint imaging system to be rectified in operational use to correct for the systematic distortion to generate rectified images with relatively low amounts of residual distortion present. Rectifying the images to remove systematic distortion based on the geometric model, without physically adjusting and/or correcting the manufactured fingerprint imaging system or its components, enables the manufactured fingerprint imaging system to be manufactured with relatively lower tolerances, without degrading the precision of the images generated by the system. This may enable an enhancement in the precision of generated images and/or a lower cost for comparable precision.

In a system design phase, a three dimensional geometric model of the conceptual fingerprint imaging system may be determined. This geometric model may describe the surfaces in the conceptual fingerprint imaging system that transmit, reflect, refract light, and/or otherwise process light. For example, an optical design tool such as Zemax may provide an ability to define such a geometric model as a series of surfaces.

In a manufacturing phase, a fingerprint imaging system may be manufactured according to the conceptual fingerprint imaging system. Once a fingerprint imaging system is built, a geometric model of the fingerprint imaging system may be determined based on one or more images of a predetermined target captured by the fingerprint imaging system. The target may include objects that may be measured with accuracy below the tolerance level desired in output images from the fingerprint imaging system. For instance, the target may include a precision glass target with dark circles provided at a periodic pitch on a reflective background.

In some embodiments of the invention, determining the geometric model of the fingerprint imaging system may include inputting an image of the target captured by the fingerprint imaging system, adjusting surface parameters that describe the surfaces within the fingerprint imaging system at which light may be processed, and returning the actual relative optical component locations within the manufactured fingerprint imaging system. The surface parameters may describe, for example, a location of a surface, a directional orientation of a surface, an index of refraction of an optical element that forms the surface, and/or other parameters. In some instances, one tool implemented to adjust the surface parameters may include a merit function that numerically compares predicted locations of the objects in the target to the observed locations of the objects in the captured image of the target.

According to various embodiments of the invention, once an image of the target is captured using the fingerprint imaging system, the merit function may be implemented to compare the conceptual fingerprint imaging system to the fingerprint imaging system. By running a geometric model determination method, surface parameters of the geometric model describing the conceptual fingerprint imaging system can be adjusted so that the relative location of the surfaces in the geometric model describe the surfaces as they are located and formed within the manufactured fingerprint imaging system. The surface parameters may be adjusted until the geometric model predicts an image that adequately coincides with image of the target captured by the manufactured fingerprint imaging system. That is, by adjusting the merit function's value toward a predetermined value (e.g., 0), the geometric model defining the relative three-dimensional location of the surfaces in the manufactured fingerprint imaging system may become an adequate predictor of how light within the manufactured fingerprint imaging system may be processed to generate an image. The surface parameters determined for the geometric model may then be stored for image rectification.

In operation, a positional relationship between an observed pixel in an image captured by the fingerprint imaging system and a rectified pixel in a rectified image suitable for output and/or further processing may be determined using the geometric model's surface parameters. More specifically, the geometric model may enable ray tracing to be used to generate one or more rectified pixels based on one or more observed pixels in a captured image. In some instances, an interpolation method may be employed to determine the rectified pixels. For example, the relationship between rectified pixel locations and observed pixel locations can be encoded as one or several pre-calculated lookup tables which may then be used for real-time image reconstruction.

In some embodiments of the invention, one or both of the observed image and the rectified image may be analyzed to determine the likelihood that the system is still within the tolerances, for the alignment of optical components within the system as well as the components themselves, specified when the system was manufactured.

DETAILED DESCRIPTION

Figure 1:
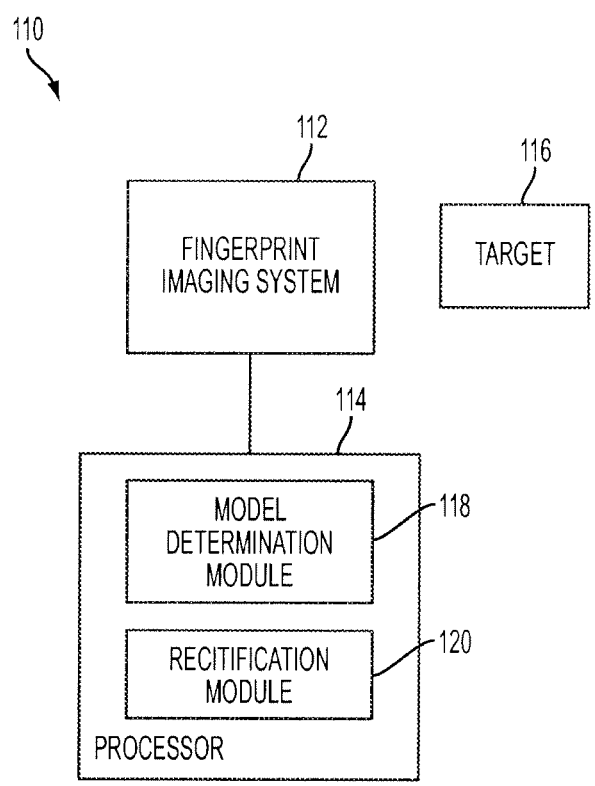
FIG. 1 is an exemplary illustration of a system for determining a geometric model of a fingerprint imaging system, according to some embodiments of the invention.

FIG. 1 is an exemplary illustration of a system 110 for determining a geometric model of a fingerprint imaging system 112. The geometric model may be implemented, by system 110, for example, to rectify images captured by fingerprint imaging system 112. System 110 may include fingerprint imaging system 112, processor 114, and target 116. Although processor 114 may be illustrated as a single component in FIG. 1, it may be appreciated that processor 114 may include a plurality of processors connected via an operative link. In some embodiments, the plurality of processors may be located centrally in a single location. In other embodiments, one or more of the plurality of processors may be located remotely from each other. The operative link between the plurality of processors may include a communications link, such as a wired, or wireless communications link, and may include a connection established over a network, or via a direct connection. Information may pass between fingerprint imaging system 112 and processor 114 via an operative link. The information may include control information, geometric model information, setting information, image information, or other information.

Figure 2:
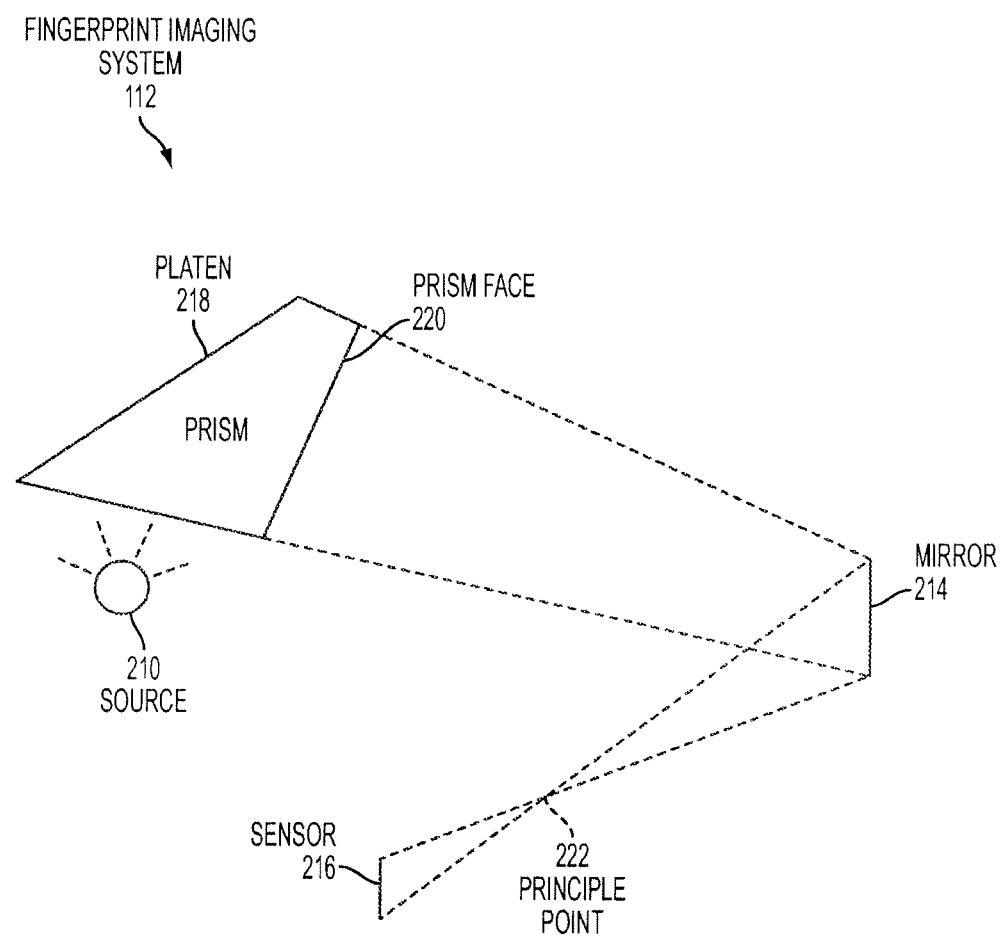
FIG. 2 is an exemplary illustration of a fingerprint imaging system, in accordance with some embodiments of the invention.

FIG. 2 is an exemplary illustration of fingerprint imaging system 112, according to some embodiments of the invention. Fingerprint imaging system 112 may include a radiation source 210 and one or more optical elements. For example, the optical elements may include a prism 212, a mirror 214, and a sensor 216. In other embodiments of the invention, the optical elements may include other types of elements, such as lenses, apertures, and/or other optical elements. Additionally, the various optical elements may be arranged in configurations different from the one illustrated in FIG. 2 without departing from the scope of the invention.

In some embodiments of the invention, light emitted by radiation source 210 may be incident on a platen 218 of prism 212 at an angle greater than the critical angle of prism 212 such that the light may be internally reflected from platen 218. At platen 218, a pattern of an object in contact with platen 218, such as the fingerprints of an individual holding at least a portion of his/her hand in contact with platen 218, may be imparted to the light. The light reflected from platen 218 may pass out of prism 212 at a prism face 220 and become incident on minor 214. The light from prism 212 may be reflected by mirror 214 through a principle point 222 of fingerprint imaging system 112 and onto sensor 216. Sensor 216 may include an electronic image sensor, such as a CMOS chip, a CCD chip, or another image sensor. The light incident on sensor 216 may form an image of the object in contact with platen 218. Sensor 216 may capture the image formed by the light.

It should be appreciated that the embodiment of fingerprint imaging system 112 shown in FIG. 2 is provided for illustrative purposes, and that the invention contemplates the implementation of any arrangement of optical components capable of imaging the fingerprints of an individual. For example, fingerprint imaging system 112 may include a finger print imaging system as described in the co-pending U.S. patent application Ser. No. 11/030,327, which is incorporated herein by reference.

In some embodiments of the invention, fingerprint imaging system 112 may be built according to a fingerprint imaging system design for a conceptual fingerprint imaging system. As with most manufactured systems, the specifications of fingerprint imaging system 112, including the location and orientation of optical elements 212, 214 and 216, as well as optical elements 212, 214, and 216 themselves, may be manufactured and assembled within predefined tolerances of the specifications of the conceptual fingerprint imaging system. However, the manufacturing of fingerprint imaging system 112 according to the specifications may not be perfect. Deviations of fingerprint imaging system 112 from the conceptual fingerprint imaging system, even deviations within the predefined tolerances, may lead to distortion in the image of the object that is captured by sensor 216.

Returning to FIG. 1, processor 114 may include a model determination module 118 and a rectification module, among other modules. It should be appreciated that the representation of modules 114 and 116 are provided for illustrative purposes, and that each module may include one or more components that perform the functionalities assigned to modules 114 and 116, as well as other functions. Modules 114 and 116 may include components implemented as hardware, software, firmware, a combination of hardware, software, and/or firmware, as well as in other mediums.

In some embodiments of the invention, model determination module 118 may operate to determine a geometric model of fingerprint imaging system 112. The geometric model may account for the deviations between the specifications of fingerprint imaging system 112 and the conceptual fingerprint imaging system. In some instances, model determination module 118 may implement a geometric model determining method such as the one described in further detail below to determine the geometric model.

According to various embodiments of the invention, rectification module 120 may operate to rectify images captured by fingerprint imaging system 112 in accordance with the geometric model. Rectification module 120 may use the geometric model of fingerprint imaging system 112 determined by model determination module 118 to rectify the images captured. In some embodiments, rectification module 120 may implement the geometric model in a bilinear interpolation to rectify captured images.

Figure 3:
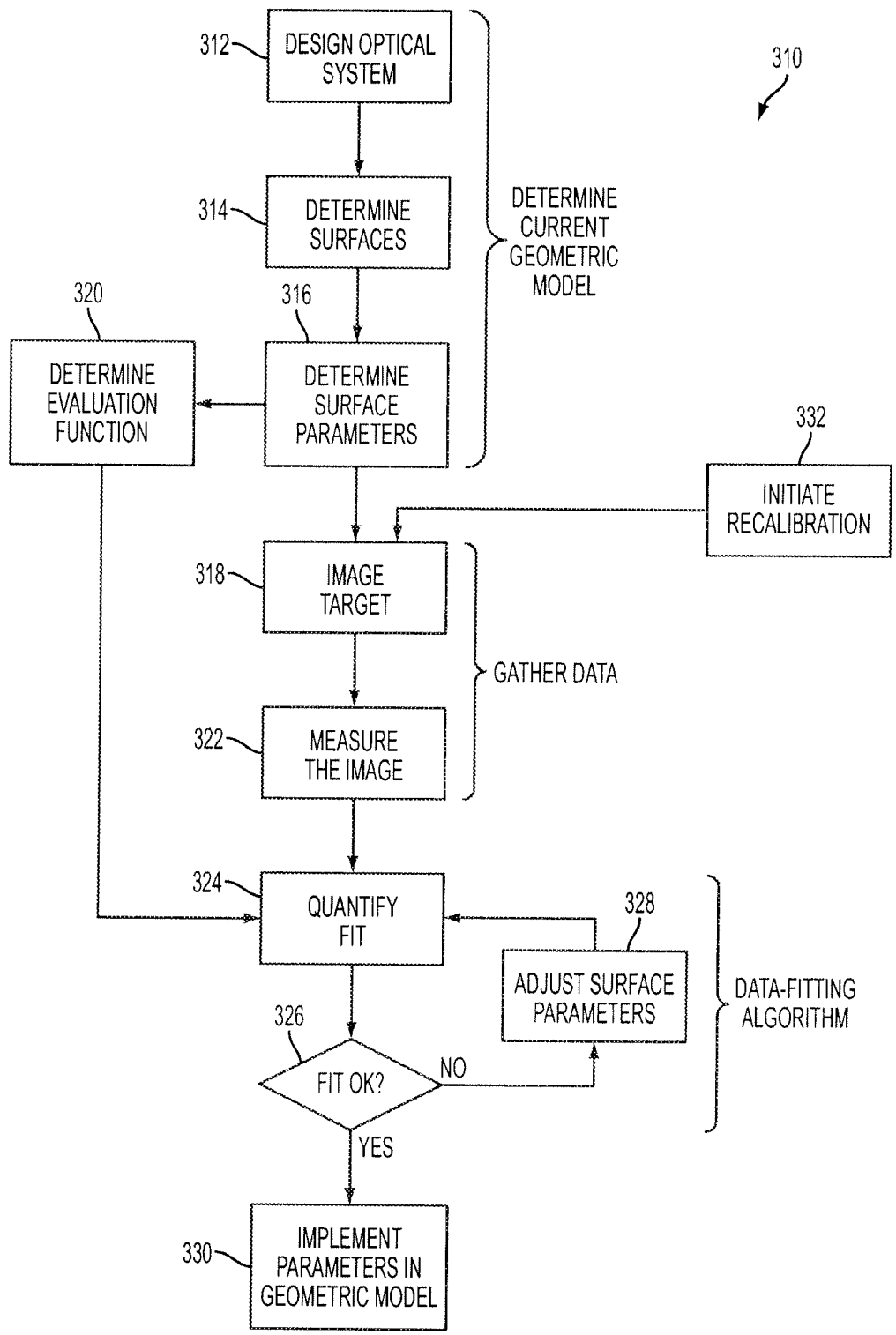
FIG. 3 is an exemplary illustration of a method of determining a geometric model of a fingerprint imaging system, according to some embodiments of the invention.

FIG. 3 illustrates a method 310 of determining a geometric model of a fingerprint imaging system, in accordance with some embodiments of the invention. At a step 312, a conceptual fingerprint imaging system may be designed. For example, designing the conceptual fingerprint imaging system may include determining the location and orientation of one or more optical elements within the conceptual fingerprint imaging system to capture an image. In some embodiments, the one or more optical elements may include a prism, a mirror, an imaging surface, a lens, a beam splitter, a film, or other optical elements. The location and orientation of the one or more optical elements may be determined to capture a certain type (or types) of images, such as, for instance, hand or finger prints. The conceptual fingerprint imaging system may be designed using optical design software such as Zemax that includes ray tracing and other optical design capabilities. In one embodiment, the conceptual fingerprint imaging system may include the conceptual fingerprint imaging system for fingerprint imaging system 112 of FIG. 1.

At a step 314, one or more surfaces at which light is processed (e.g., reflected, refracted, captured, etc.) within the conceptual fingerprint imaging system may be determined. The surfaces may include the surfaces of the optical elements at which light may be processed within the fingerprint imaging system. For example, some embodiments in which the conceptual fingerprint imaging system includes the conceptual fingerprint imaging system for fingerprint imaging system 112 of FIG. 1, the surfaces may include platen 218, prism face 220, mirror 214, and sensor 216.

At a step 316, the location and orientation of the surfaces within the conceptual fingerprint imaging system may be defined in terms of one or more parameters, such as, for example, surface parameters. The surface parameters may describe, for example, a location of a surface, a directional orientation of a surface, a shape of a surface, an index of refraction of an optical element that forms a surface, and/or other parameters. In combination, the surface parameters may form an initial geometric model that may describe the conceptual fingerprint imaging system. Or, in other words, the initial geometric model would describe the manufactured fingerprint imaging system, if that fingerprint imaging system were manufactured to be substantially identical to the conceptual fingerprint imaging system, and included virtually no imperfections in the configuration of the one or more optical elements and/or the optical elements themselves.

In some embodiments, the surface parameters may include: three 3-dimensional points that may define flat sensor 216, the three points may include two points that define an edge of sensor 216 as a vector and a third point on sensor 216 that does not lie on this edge; a single 3-dimensional point that defines the principal point of the imaging system; one 3-dimensional point on the surface of mirror 214 and one 3-dimensional direction vector that defines a normal to the surface of mirror 214; the distances from each of three corners on sensor 216 to prism face 220 along the optical path; the intersection vector between the prism face 220 and the platen 218; and the angle between the prism face 220 and the platen 218. These 28 parameters may define the spatial relationship between platen 218, prism face 220, mirror 214, principal point 222, and sensor 216 in three dimensional space. It should be appreciated that in other embodiments alternative parameters may be used to completely define the relationships of the surfaces (or the optical components), and that the parameters above are recited for illustrative purposes.

At a step 318, a target may be imaged by a fingerprint imaging system built according to the design of the conceptual fingerprint imaging system. The target may be located at a predetermined imaging location with respect to the fingerprint imaging system. The target may include graphics in which one or more distinguishing points may be emphasized graphically. The distinguishing points may include lines, squares, points, circles, rectangles, or any other shape or mark that may be geometrically analyzed to according to the algorithm described herein. The locations and/or distances between the distinguishing points may be measured and recorded with some degree of precision prior to step 318, as a reference. It should be appreciated that in order measure and/or record the locations and/or distances between the distinguishing points, the same position on each distinguishing point may be identified (e.g., the center, a common corner, etc.).

In some embodiments of the invention, the target may include target 116 of system 110. Target 116 may include a precision target that includes distinctive objects located in a periodic manner on a reflective background. For example, target 116 may include a chrome on glass target that has chrome dots with a diameter of 1.5 mm provided at a 3.0 mm pitch. Target 116 may be mated with platen 218 using an index matching fluid. Such a target may be commercially available from various sources including Applied Optics.

At a step 320, an evaluation function may be determined. The evaluation function yields values expressing differences between predictions related to a calculated location (or locations) of the image of the target based on the conceptual fingerprint imaging system and a measured location (or locations) of the image of the target captured by the actual fingerprint imaging system. The predictions may include predictions of the location of the images of the distinguishing points, predictions of the distances between the images of the distinguishing points, or other predictions. These predictions may be made via a ray tracing capability of the optical design software used to design conceptual fingerprint imaging system. More specifically, ray tracing may be used to predict what the locations of the images of the distinguishing points, or the distances of the images of the distinguishing points, would be by tracing light backwards through the conceptual fingerprint imaging system, from the surface in the conceptual fingerprint imaging system wherein the image of the target would be captured, through the optical elements in the fingerprint imaging system, to the surface in the conceptual fingerprint imaging system where the target would be positioned. The optical design software may leverage surface parameters to trace the light through the conceptual fingerprint imaging system in order to make these predictions. Thus, the surface parameters may be parameters of the evaluation functions.

For example, an evaluation function F, may describe a difference between a predicted distance between two particular distinguishing points, points i and j, for example, and a distance between a captured image of the distinguishing point i and a captured image of the distinguishing point j, as a function of the points i and j, in which the surface parameters (p) are implemented as parameters of F. This evaluation function F may be described as $$d_{i,j} = F(i,j|p). \tag{1}$$

Another way of conceptualizing the evaluation function may be as a plurality of evaluation functions, one for each pair of distinguishing points in the image of the target, that determines the difference between a predicted distance between two or more distinguishing points in the captured image, and the measured distance between the corresponding distinguishing points in the captured image, as a function of the surface parameters (p). This set of evaluation functions may be represented as $F_{1,2}(p)$, $F_{1,3}(p)$, ..., $F_{1,n}(p)$, $F_{2,1}(p)$, $F_{2,3}(p)$, ..., $F_{2,n}(p)$, ..., $F_{n,n}(p)$ for distinguishing points i=1 to n. Note that $F_{i,i}(p)$ is 0, because the distance between any distinguishing point and itself is 0. It should be appreciated that alternate evaluation functions that describe the performance of the fingerprint imaging system may be implemented.

At a step 322, the actual image of the target captured by the fingerprint imaging system may be measured. Measuring the image of the target may include determining the locations of the images of the distinguishing points and/or measuring the distances between the distinguishing points within the image. In some embodiments of the invention in which the target includes circular dots provided at a predetermined pitch, the images may be distorted in the image captured by the fingerprint imaging system. In such embodiments, circular dots may be extracted from the target by implementing an algorithm that assumes that the circles are ellipses, and determines the centers of the ellipses. For example, an algorithm may be implemented that uses a super-resolution approach to identifying the edges of the ellipses to enable a determination of the centers of the ellipses within an acceptable tolerance. For each pair of ellipses, a distance between the centers of the ellipses may be determined. For instance, if 100 dots were identified in the captured image, there are 100*99/2=4,950 dot pairs for which distances may be determined.

Beginning at a step 324, a data-fitting algorithm may be implemented to minimize the evaluation function(s) by adjusting the surface parameters to more accurately represent the actual configuration of the fingerprint imaging system that may include imperfections in the optical elements and/or their location and/or orientation within the system. The data-fitting algorithm may include a known iterative non-linear data-fitting algorithm, such as a Levenberg-Marquardt algorithm, a Gauss Newton algorithm, or another iterative or non-iterative data-fitting algorithm for linear or non-linear systems. For example, a Levenberg-Marquardt algorithm may be implemented to minimize a metric function (S) where the metric function is the sum of the evaluation functions. This sum may be represented mathematically as $$S(p) = \sum_{i=1}^{n} \sum_{j=1}^{n} [F_{i,j}(p)]^2. \tag{2}$$

At the step 324, the value of the metric function may be determined for the current surface parameters. The value of the metric function may represent a "goodness of a fit" between the current surface parameters and the actual surface parameters of the fingerprint imaging system. In other words, the metric function may quantify the accuracy with which the current surface parameters describe the manner in which light is processed within the fingerprint imaging system. In other embodiments, other functions account for differences between the predicted positions of, or distances between, the distinguishing points of the target and the values measured in the image of the target. For example, an average of the evaluation functions may be implemented as the metric function. Other metric functions and evaluation functions may be implemented.

The premise of the Levenberg-Marquardt algorithm and other data-fitting algorithms may include collecting the overall observed error and adjusting the surface parameters by a certain amount. As may be appreciated by one of ordinary skill in the art, in this algorithm, the amount to adjust the parameters by may be calculated from the gradient of the merit function with respect the each individual surface parameter. Thus, larger slopes may elicit larger movements in the surface parameters.

In some embodiments of the invention, calculating the gradient of a function that involves many calculations, such as implementing a ray tracing program to predict locations of the images of the distinguishing points as described above, especially when deriving the derivatives directly, may prove to be computationally intractable. In such embodiments, to calculate such gradients, an automatic differentiation software package named ADOL may be implemented. This program is accessible from various sources, such as, at www-.math.tu-dresden.de/~adol-c/and may include a built in a DLL interface. Basically, ADOL may track a sequence of mathematical calculations, one building upon the other and, when the evaluation of a function is complete, a record of the sequence of calculations may be used (at a given input point) the evaluate the gradient at that point. Using ADOL, the function for which the gradient is being taken may be multivariate and very complex, and yet this approach may accurately identify the gradient at the given input point. Thus, to find the gradient of the metric function for a set of parameter values, a call may be made to calculate the gradient within an ADOL library after the metric function is evaluated at the set of evaluation functions.

At a step 326, the metric function value may be evaluated to determine if the current surface parameters adequately define the configuration of the fingerprint imaging system. In some embodiments, the metric function value may be compared to a threshold value at step 326. If the metric function value is greater than the threshold value then method 310 may proceed to a step 328. At the step 328, the surface parameters may be adjusted in accordance with the implemented curve-fitting algorithm. From step 328, method 310 may loop back for another iteration through steps 24 and 26. If it is determined at step 326 that the metric function value of the current surface parameters adequately define the configuration of the fingerprint imaging system (e.g., the metric function value is less than the threshold value), then method 310 may proceed to a step 330. At step 330, the current surface parameters are adopted as the surface parameters of the fingerprint imaging system, and are implemented in a geometric model of the actual fingerprint imaging system. The geometric model may then be implemented to rectify images captured by the fingerprint imaging system.

Figure 4A:
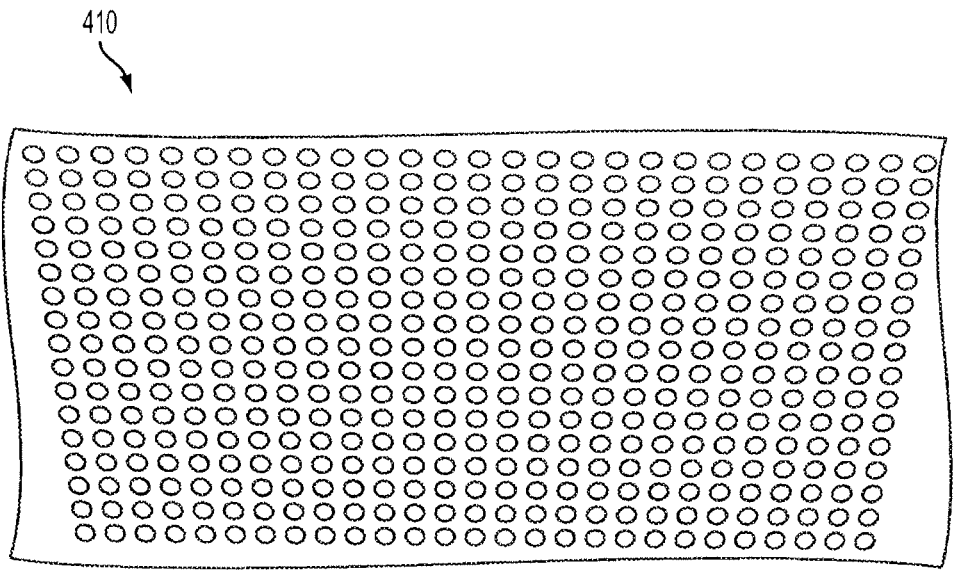
FIG. 4 is an exemplary illustration of a captured image and a rectified image generated from the captured image, in accordance with various embodiments of the invention.
Figure 4B:
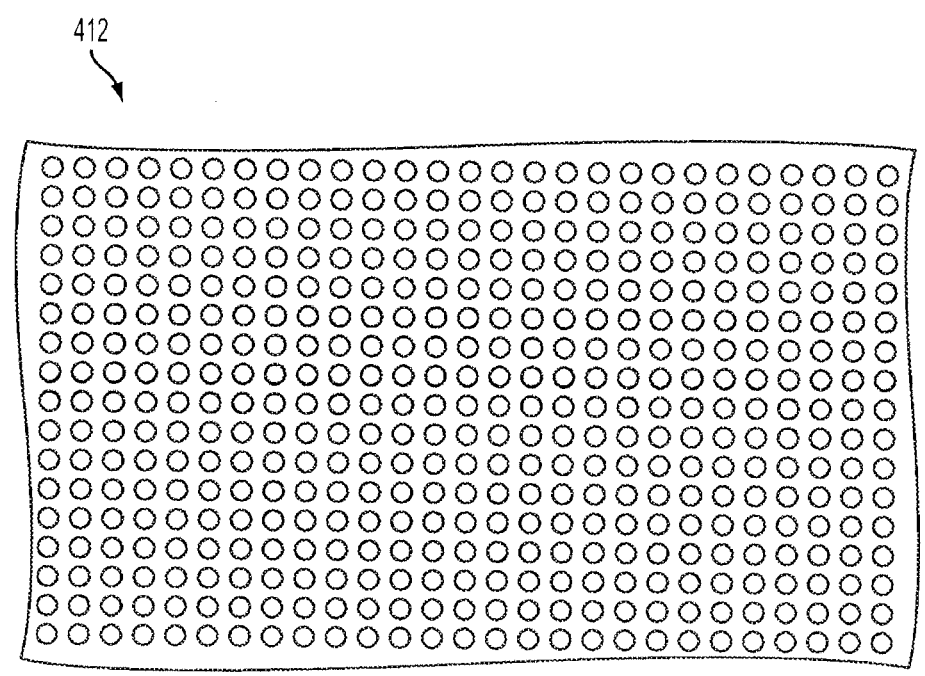

FIGS. 4A and 4B are exemplary illustrations of a captured image 410, captured by a fingerprint imaging system that includes systematic distortion introduced by imperfections in the fingerprint imaging system, and a rectified image 412, generated by rectifying captured image 410 based on a geometric model of the fingerprint imaging system to remove the systematic distortion. The systematic distortions that may be present within compound lens systems (e.g., barrel distortion, pincushion distortion, etc.) may also be corrected by implementing the method described above. For example, the geometric model used to generate rectified image 412 from captured image 410 may be determined according to method 310.

In some embodiments of the invention, based on the geometric model, ray tracing software, such as the optical design software discussed above, may be implemented to trace ray paths through the fingerprint imaging system from the imaging location within the fingerprint system where the target (or other objects to be imaged) are placed to the surface within the fingerprint imaging system where the image of the target may be captured. Based on these ray paths, positional relationships between observed positions of one or more distinguishing points in an image of an object captured by the fingerprint imaging system and the positions within the image that the one or more distinguishing points may have been located if substantially no distortion were introduced by imperfections in the fingerprint imaging system can be ascertained with suitable accuracy. Using these positional relationships, rectified pixels in a rectified image may be generated from observed pixels in a captured image. The rectified image may be suitable for output and/or further processing using the geometric model. In short, the geometric model may enable ray tracing to be used to generate one or more rectified pixels based on one or more observed pixels in a captured image. In some instances, once the initial ray tracing and determination of the positional relationships, as described above, have been accomplished, the positional relationships may be used to employ an interpolation method to determine the rectified pixels in images captured by the fingerprint imaging system thereafter. For example, the positional relationships between rectified pixel locations and observed pixel locations can be encoded as one or more pre-calculated lookup tables which may then be used for real-time image reconstruction.

According to various embodiments of the invention, one or both of the observed image and the rectified image may be analyzed to determine the likelihood that the system is still producing images with less than a predetermined amount of distortion. For example, in some instances, fingerprint imaging system 112 may be implemented and at various times after the initial determination of the geometric model, image target 116 may be captured in order to determine a current metric function value. By way of illustration, at a step 332, shown in FIG. 3, a user may initiate a re-determination of the geometric model that may cause an image of target 116 to be captured at step 318 of method 310. From step 318, method 310 may be followed, as described above, to adjust the surface parameters within the geometric model, if need.

It may be appreciated that although the invention has been described in terms of algorithmic correction of image distortions within fingerprint imaging systems, that this disclosure is not intended as limiting. Accordingly, the software implemented system and method contemplated by this disclosure may be implemented to correct image distortions within other optical imaging systems, thereby reducing a cost of providing imaging systems capable of generating images with a predetermined precision.

It can thus be appreciated that embodiments of the invention have now been fully and effectively accomplished. The foregoing embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A method of calibrating a geometric model of a fingerprint imaging system, the geometric model defining geometry of reflective and/or refractive surfaces associated with optical elements within the fingerprint imaging system at which light is reflected or refracted, the geometric model including a plurality of surface parameters that specify relative physical positions of reflective and/or refractive surfaces within the fingerprint imaging system in relation to other reflective and/or refractive surfaces within the fingerprint imaging system in three-dimensional space, the method comprising:

capturing an image of a predetermined target with the fingerprint imaging system, the target including distinguishing points provided at predetermined positions on the target;

measuring positions of the distinguishing points in the captured image of the target;

comparing the measured positions of the distinguishing points in the captured image to positions of distinguishing points predicted according to the geometric model of the fingerprint imaging system; and adjusting the surface parameters of the geometric model that specify the relative physical positions of reflective and/or refractive surfaces associated with optical elements in the fingerprint imaging system based on the comparison between the measured positions of the distinguishing points and the predicted positions of the distinguishing points without mechanically adjusting the relative physical positions of the refractive and/or reflective surfaces of the optical elements.

2. The method of claim 1, wherein comparing the measured positions of the distinguishing points to the predicted positions of the distinguishing points comprises determining evaluation functions that describe a predicted difference between measured positions and predicted positions of a set of one or more distinguishing points, the surface parameters being parameters in the evaluation functions.

3. The method of claim 1, wherein comparing the measured positions of the distinguishing points to the predicted positions of the distinguishing points comprises determining a value of a metric function for the surface parameters, wherein the metric function describes an accuracy of the geometric model in predicting the positions of the distinguishing points in the captured image of the target as a function of the surface parameters.

4. The method of claim 3, wherein the step of adjusting the surface parameters is performed as part of a curve-fitting algorithm designed to minimize the metric function.

5. The method of claim 4, wherein the curve-fitting algorithm comprises an iterative non-linear algorithm.

6. The method of claim 5, wherein the curve-fitting algorithm comprises a Levenberg-Marquardt algorithm or a Gauss Newton algorithm.

7. The method of claim 1, further comprising storing the adjusted surface parameters.

8. The method of claim 7, further comprising rectifying an image captured with the fingerprint imaging system based on the adjusted and stored surface parameters.

9. The method of claim 1, wherein the surface parameters comprise distances from a first reflective or refractive surface to a plurality of locations on a second reflective or refractive surface within the fingerprint imaging system.

10. The method of claim 1, further comprising predicting positions of the distinguishing points in the captured image based on ray tracing through the geometric model of the fingerprint imaging system.

11. A method of determining a geometric model of a fingerprint imaging system that captures images of an object located in an object plane of the system, the geometric model defining geometry of reflective and/or refractive surfaces associated with optical elements within the fingerprint imaging system at which light is reflected or refracted, the images being captured in an imaging plane of the system in which an image of the object is formed, the method comprising:

determining information related to a position of one or more optical surfaces within the fingerprint imaging system, wherein the one or more optical surfaces comprise reflective and/or refractive surfaces associated with optical elements at which light is reflected or refracted within the fingerprint imaging system;

generating a geometric model of the fingerprint imaging system that defines geometric positions of the one or more optical surfaces that reflect and/or refract light within the fingerprint imaging system in relation to each other, wherein a position of a given optical surface is defined within the geometric model by one or more surface parameters of the optical surface, the one or more surface parameters specifying relative physical positions of reflective and/or refractive surfaces within the fingerprint imaging system in relation to other reflective and/or refractive surfaces within the fingerprint imaging system in three-dimensional space;

determining one or more evaluation functions of the fingerprint imaging system that enable prediction of locations of visual information in the image plane of the fingerprint imaging system based on locations of the corresponding visual information in the object plane of the fingerprint imaging system, wherein the one or more surface parameters are parameters of the one or more evaluation functions;

capturing an image in the image plane of the fingerprint imaging system, wherein the captured image is of a predetermined target located at the object plane of the fingerprint imaging system, the target including distinguishing points provided at predetermined positions thereon;

predicting positions of the distinguishing points in the captured image of the predetermined target based on the one or more evaluation functions;

measuring positions of the distinguishing points in the captured image of the predetermined target;

comparing the measured positions of the distinguishing points in the captured image to the predicted positions of the distinguishing points in the captured image predicted in accordance with the one or more evaluation functions; and adjusting the surface parameters in the geometric model of the fingerprint imaging system based on the comparison between the measured positions and the predicted positions of the distinguishing points in the captured image without mechanically adjusting relative physical positions of the refractive and/or reflective surfaces of the optical elements.

12. The method of claim 11, wherein comparing the measured positions of the distinguishing points to the predicted positions of the distinguishing points comprises determining a value of a metric function for the surface parameters, wherein the metric function describes an accuracy of the geometric model in predicting the positions of the distinguishing points in the captured image of the target as a function of the surface parameters.

13. The method of claim 12, wherein the step of adjusting the surface parameters is performed as part of a curve-fitting algorithm designed to minimize the metric function.

14. The method of claim 13, wherein the curve-fitting algorithm comprises an iterative non-linear algorithm.

15. The method of claim 14, wherein the curve-fitting algorithm comprises a Levenberg-Marquardt algorithm or a Gauss Newton algorithm.

16. The method of claim 11, wherein the measured positions of the distinguishing points and the predicted positions of the distinguishing points comprise positions of the distinguishing points in relation to each other.

17. The method of claim 11, further comprising storing the adjusted surface parameters for rectifying images captured by the fingerprint imaging system.

18. A method of calibrating a geometric model of a fingerprint imaging system, the geometric model defining geometry of reflective and/or refractive surfaces associated with optical elements within the fingerprint imaging system at which light is reflected or refracted, including a plurality of surface parameters that specify relative physical positions of reflective and/or refractive surfaces within the fingerprint imaging system in relation to other reflective and/or refractive surfaces within the fingerprint imaging system in three dimensional space, the method comprising:

capturing an image of a predetermined target with the fingerprint imaging system, the target including distinguishing points provided at predetermined positions;

predicting positions of one or more of the distinguishing points in the captured image of the predetermined target based on the geometric model;

determining, based on a comparison of the captured image and the predicted positions of the one or more distinguishing points, a value of a metric function that describes an accuracy of the geometric model in defining the geometry of the reflective and/or refractive surfaces associated with optical elements within the fingerprint imaging system; and implementing a curve-fitting algorithm that adjusts the surface parameters of the geometric model that define the relative physical positions of reflective and/or refractive surfaces within the fingerprint imaging system to reduce the value of the metric function without mechanically adjusting the relative physical positions of the refractive and/or reflective surfaces of the optical elements.

19. The method of claim 18, wherein the curve-fitting algorithm comprises an iterative non-linear algorithm.

20. The method of claim 18, wherein the curve-fitting algorithm comprises a Levenberg-Marquardt algorithm or a Gauss Newton algorithm.

* * * * *